US012699464B2

(12) United States Patent
Liu et al.

(10) Patent No.: US 12,699,464 B2
(45) Date of Patent: Aug. 4, 2026

(54) DISPLAY CONTROL METHOD AND APPARATUS, DEVICE, AND MEDIUM

(71) Applicant: Beijing Zitiao Network Technology Co., Ltd., Beijing (CN)

(72) Inventors: Shuo Liu, Beijing (CN); Jia Guo, Beijing (CN); Mengqian Liu, Beijing (CN); Chi Fang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/010,826

(22) Filed: Jan. 6, 2025

(65) Prior Publication Data

US 2025/0244834 A1     Jul. 31, 2025

(30) Foreign Application Priority Data

Jan. 31, 2024    (CN) .......................... 202410135748.6

(51) Int. Cl.
*G06F 3/0346* (2013.01)
*G06F 3/038* (2013.01)

(52) U.S. Cl.
CPC ............ *G06F 3/0346* (2013.01); *G06F 3/038* (2013.01)

(58) Field of Classification Search
CPC ........ G06F 3/011; G06F 3/014; G06F 3/0346; G06F 3/038; G06F 3/017; G06F 3/0481; G06F 3/04812; G06F 3/01; G06T 19/006; G02B 27/017
See application file for complete search history.

(56) References Cited

U.S. PATENT DOCUMENTS

| | | | |
|---|---|---|---|
| 10,254,846 | B1 | 4/2019 | Kinstner et al. |
| 11,493,989 | B2 * | 11/2022 | Speelman ............... G06F 3/011 |
| 11,886,629 | B2 * | 1/2024 | Hashimoto ........... G06F 3/0304 |
| 2022/0130100 | A1 | 4/2022 | Pedrotti et al. |
| 2025/0110553 | A1 * | 4/2025 | Gouji ...................... G06F 3/011 |

FOREIGN PATENT DOCUMENTS

| | | |
|---|---|---|
| CN | 108604120 A | 9/2018 |
| CN | 113763523 A | 12/2021 |
| CN | 114432701 A | 5/2022 |
| CN | 115981544 A | 4/2023 |
| CN | 116088689 A | 5/2023 |
| CN | 117170489 A | 12/2023 |

OTHER PUBLICATIONS

Extended European Search Report for European Application No. 24223394.8, mailed May 9, 2025, 7 pages.
China National Intellectual Property Administration, Office Action and Search Report Issued in Application No. 202410135748.6, May 7, 2026, 18 pages.

* cited by examiner

*Primary Examiner* — Koosha Sharifi-Tafreshi
(74) *Attorney, Agent, or Firm* — Alleman Hall LLP

(57) ABSTRACT

The present application provides a display control method and apparatus, a device, and a medium. The method includes: obtaining real-time position information of a controller, where the controller is configured to emit a virtual ray pointing to any virtual object in a virtual space; determining a target display form of the virtual ray according to the real-time position information of the controller; and adjusting a display form of the virtual ray according to the target display form of the virtual ray.

18 Claims, 11 Drawing Sheets

Obtain real-time position information of a controller, the controller is configured to emit a virtual ray pointing to any virtual object in a virtual space — S101

Determine a target display form of the virtual ray according to the real-time position information of the controller — S102

Adjust a display form of the virtual ray according to the target display form of the virtual ray — S103

Virtual pointer form

Form with a preset
transparency

Straight line

Virtual pointer

Virtual object

Virtual ray 0.5     0.5

Near field region

Far field region

Virtual ray 0.5     0.5

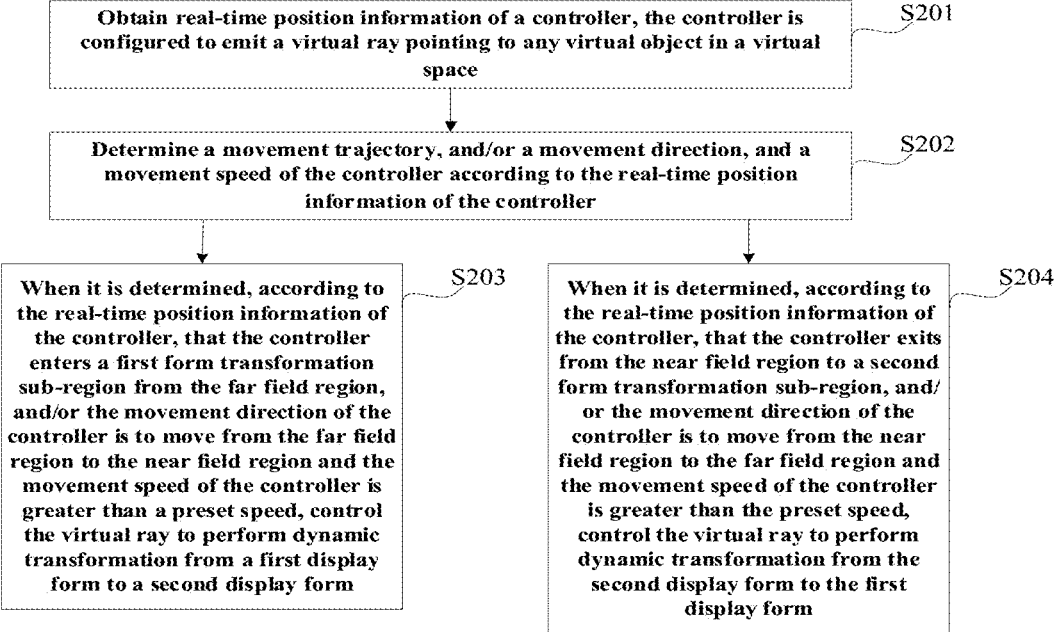

Obtain real-time position information of a controller, the controller is configured to emit a virtual ray pointing to any virtual object in a virtual space ⟋S201

Determine a movement trajectory, and/or a movement direction, and a movement speed of the controller according to the real-time position information of the controller ⟋S202

When it is determined, according to the real-time position information of the controller, that the controller enters a first form transformation sub-region from the far field region, and/or the movement direction of the controller is to move from the far field region to the near field region and the movement speed of the controller is greater than a preset speed, control the virtual ray to perform dynamic transformation from a first display form to a second display form ⟋S203

When it is determined, according to the real-time position information of the controller, that the controller exits from the near field region to a second form transformation sub-region, and/or the movement direction of the controller is to move from the near field region to the far field region and the movement speed of the controller is greater than the preset speed, control the virtual ray to perform dynamic transformation from the second display form to the first display form ⟋S204

FIG. 7

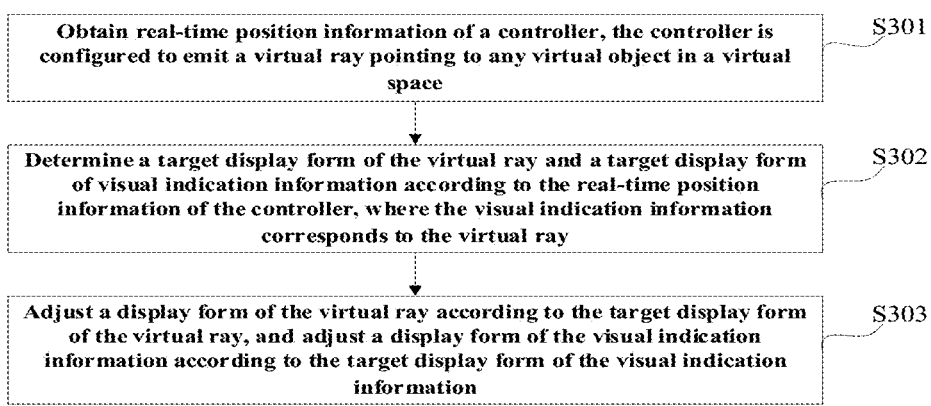

| Obtain real-time position information of a controller, the controller is configured to emit a virtual ray pointing to any virtual object in a virtual space | S301 |

| Determine a target display form of the virtual ray and a target display form of visual indication information according to the real-time position information of the controller, where the visual indication information corresponds to the virtual ray | S302 |

| Adjust a display form of the virtual ray according to the target display form of the virtual ray, and adjust a display form of the visual indication information according to the target display form of the visual indication information | S303 |

FIG. 10

Third display form

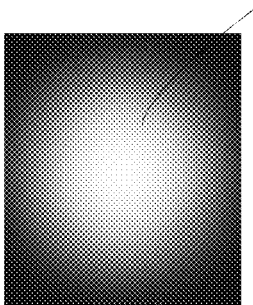

FIG. 11a

Fourth display form

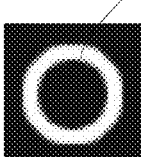

FIG. 11b

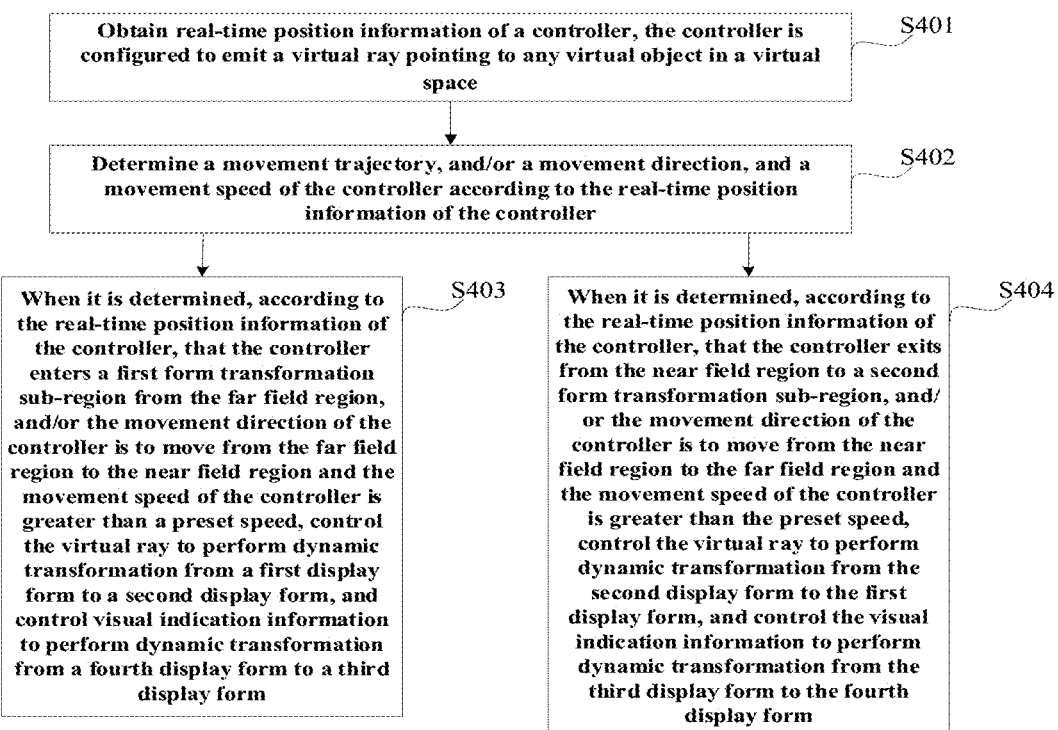

Obtain real-time position information of a controller, the controller is configured to emit a virtual ray pointing to any virtual object in a virtual space ⟶ S401

Determine a movement trajectory, and/or a movement direction, and a movement speed of the controller according to the real-time position information of the controller ⟶ S402

When it is determined, according to the real-time position information of the controller, that the controller enters a first form transformation sub-region from the far field region, and/or the movement direction of the controller is to move from the far field region to the near field region and the movement speed of the controller is greater than a preset speed, control the virtual ray to perform dynamic transformation from a first display form to a second display form, and control visual indication information to perform dynamic transformation from a fourth display form to a third display form ⟶ S403

When it is determined, according to the real-time position information of the controller, that the controller exits from the near field region to a second form transformation sub-region, and/or the movement direction of the controller is to move from the near field region to the far field region and the movement speed of the controller is greater than the preset speed, control the virtual ray to perform dynamic transformation from the second display form to the first display form, and control the visual indication information to perform dynamic transformation from the third display form to the fourth display form ⟶ S404

FIG. 12

Transformation direction of visual indication information

Third display form        Fourth display form

Transformation direction of visual indication information

Third display form        Fourth display form

DISPLAY CONTROL METHOD AND APPARATUS, DEVICE, AND MEDIUM

CROSS REFERENCE TO RELATED APPLICATION

This application claims priority from Chinese Patent Application No. 202410135748.6, filed on Jan. 31, 2024, the contents of which are hereby incorporated by reference in their entirety for all purposes.

TECHNICAL FIELD

Embodiments of the present application relate to the field of computer technologies, and in particular, to a display control method and apparatus, a device, and a medium.

BACKGROUND

Currently, when a user interacts with a virtual scene provided by an electronic device, a virtual ray may be emitted in the virtual scene by means of a handle, a gesture, or the like, to interact with a virtual object in the virtual scene by the virtual ray. The virtual scene is a three-dimensional virtual world that is generated through simulation by a computer technology and a digital simulation technology.

SUMMARY

Embodiments of the present application provide a display control method and apparatus, a device, and a medium.

According to a first aspect, an embodiment of the present application provides a display control method, including:

obtaining real-time position information of a controller, where the controller is configured to emit a virtual ray pointing to any virtual object in a virtual space;

determining a target display form of the virtual ray according to the real-time position information of the controller; and adjusting a display form of the virtual ray according to the target display form of the virtual ray.

According to a second aspect, an embodiment of the present application provides a display control apparatus, including:

a position obtaining module, configured to obtain real-time position information of a controller, where the controller is configured to emit a virtual ray pointing to any virtual object in a virtual space;

a form determining module, configured to determine a target display form of the virtual ray according to the real-time position information of the controller; and a form adjusting module, configured to adjust a display form of the virtual ray according to the target display form of the virtual ray.

According to a third aspect, an embodiment of the present application provides an electronic device, including:

a processor and a memory, where the memory is configured to store a computer program, and the processor is configured to invoke and execute the computer program stored in the memory, to perform the display control method according to the embodiment of the first aspect or the implementations thereof.

According to a fourth aspect, an embodiment of the present application provides a computer-readable storage medium, configured to store a computer program, where the computer program enables a computer to perform the display control method according to the embodiment of the first aspect or the implementations thereof.

According to a fifth aspect, an embodiment of the present application provides a computer program product including program instructions, where when the program instructions are executed on an electronic device, the electronic device is enabled to perform the display control method according to the embodiment of the first aspect or the implementations thereof.

BRIEF DESCRIPTION OF THE DRAWINGS

In order to more clearly describe the technical solutions in the embodiments of the present application, the following briefly describes the accompanying drawings used in describing the embodiments. It is clear that the accompanying drawings in the following description illustrate merely some embodiments of the present application, and a person of ordinary skill in the art may still derive other drawings from these accompanying drawings without creative efforts.

FIG. 7 is a flowchart of another display control method according to an embodiment of the present application;

FIG. 10 is a flowchart of still another display control method according to an embodiment of the present application;

FIG. 11a is a schematic diagram of a third display form being a halo form according to an embodiment of the present application;

FIG. 11b is a schematic diagram of a third display form being a ring form according to an embodiment of the present application;

FIG. 12 is a flowchart of yet another display control method according to an embodiment of the present application;

DETAILED DESCRIPTION OF EMBODIMENTS

Figure 1:
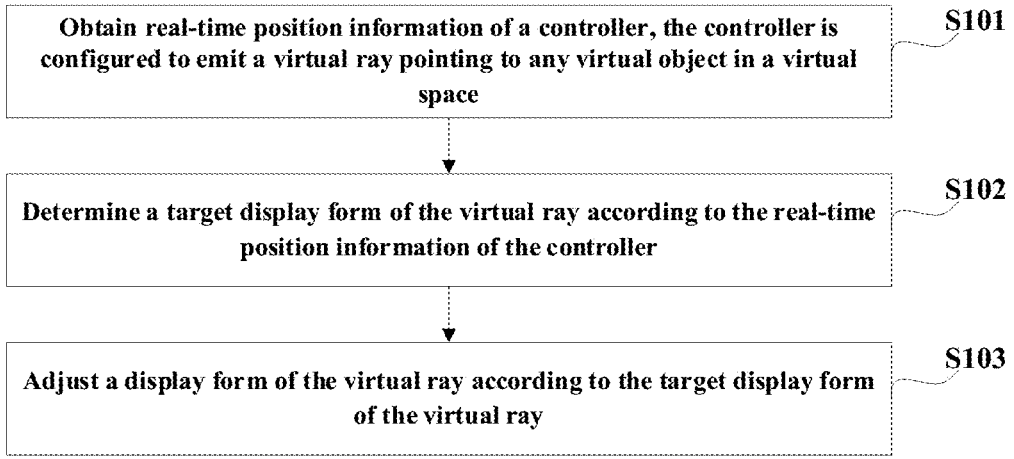
FIG. 1 is a flowchart of a display control method according to an embodiment of the present application.

The following clearly and completely describes the technical solutions in the embodiments of the present application with reference to the accompanying drawings in the embodiments of the present application. Apparently, the described embodiments are merely some rather than all of the embodiments of the present application. All other embodiments obtained by a person of ordinary skill in the art based on the embodiments of the present application without creative efforts shall fall within the protection scope of the present application.

It should be noted that the terms "first" and "second" in the specification, claims, and accompanying drawings of the present application are intended to distinguish between similar objects but do not necessarily indicate a specific order or sequence. It should be understood that the data termed in such a way is interchangeable in proper circumstances so that the embodiments of the present application described herein can be implemented in orders except the order illustrated or described herein. Moreover, the terms "include", "have", or any other variant thereof are intended to cover non-exclusive inclusion. For example, a process, method, system, product, or server that includes a list of steps or units is not necessarily limited to those explicitly listed, but may include other steps or units not explicitly listed or inherent to such process, method, product, or apparatus.

In the embodiments of the present application, the words "exemplary" or "for example" are used to mean serving as an example, illustration, or description. Any embodiment or design described as "exemplary" or "for example" in the embodiments of the present application shall not be construed as being preferred or advantageous over other embodiments or designs. Rather, the use of words such as "exemplary" or "for example" is intended to present the concept in a specific manner.

In the description of the embodiments of the present application, unless otherwise specified, "a plurality of" means two or more than two, that is, at least two. "At least one" means one or more than one.

To facilitate understanding of the embodiments of the present application, before describing the embodiments of the present application, some concepts involved in all the embodiments of the present application are appropriately explained as follows.

1) Virtual reality (VR) is a technology for creating and experiencing a virtual world. A virtual environment is generated, which is a multi-source information (the virtual reality mentioned in this article includes at least visual perception, and may further include auditory perception, tactile perception, motion perception, or even gustatory perception, olfactory perception, etc.). A fused and interactive three-dimensional dynamic view and entity behavior simulation of virtual environment are implemented, so that a user can be immersed in a simulated virtual reality environment, and various virtual environment applications such as maps, games, videos, education, medical care, simulation, collaborative training, sales, manufacturing assistance, maintenance and repair are implemented.

2) A VR device is a terminal that implements a virtual reality effect. Usually, it can be provided as a form of glasses, a head-mounted display (HMD), or contact lenses for implementing visual perception and other forms of perception. Certainly, the form implemented by the VR device is not limited thereto, and it can be further miniaturized or enlarged according to actual requirements.

Optionally, the VR device described in this embodiment of the present application may include but is not limited to the following types.

2.1) A PC virtual reality (PCVR) device: A PC is used to perform related calculation and data output for the virtual reality function, and an externally connected PC virtual reality device uses data output by the PC to implement the virtual reality effect.

2.2) A mobile virtual reality device: A mobile terminal (such as a smart phone) can be set in various manners (such as a head-mounted display with a dedicated card slot), and the mobile terminal performs related calculation of the virtual reality function and outputs data to the mobile virtual reality device through a wired or wireless connection with the mobile terminal. For example, a virtual reality video is watched through an APP of the mobile terminal.

2.3) An all-in-one virtual reality device: It has a processor for performing related calculation of the virtual function, and therefore has an independent virtual reality input and output function. It is not required to be connected to a PC or a mobile terminal, and has high freedom of use.

3) Augmented reality (AR) is a technology of calculating, in real time, a camera pose parameter of a camera in a real world (or a three-dimensional world or a real world) in a process of image acquisition by the camera, and adding a virtual element to an image acquired by the camera based on the camera pose parameter. The virtual element includes but is not limited to an image, a video, and a three-dimensional model. The goal of the AR technology is to superimpose a virtual world on the real world on a screen for interaction.

4) Mixed reality (MR): A virtual scene information is presented in a real scene to establish an interactive feedback information loop among the real world, the virtual world, and a user, so as to enhance the reality of the user experience. For example, a simulated setting integrates computer-created sensory input (for example, a virtual object) with sensory input from a physical setting or a representation thereof. In some MR settings, the computer-created sensory input may be adapted to changes in sensory input from the physical setting. In addition, some electronic systems for presenting MR settings may monitor an orientation and/or position relative to the physical setting, so that the virtual object can interact with the real object (that is, a physical element or a representation thereof from the physical setting). For example, the system can monitor motion, so that a virtual plant appears to be stationary relative to a physical building.

5) XR refers to a virtual environment created by combining a real object and a virtual object through a computer to provide a human-computer interactive virtual environment. XR is also a general term for various technologies such as VR, AR, and MR. By integrating the visual interaction technologies of the three, a "sense of immersion" of seamless conversion between the virtual world and the real world is provided to the user.

6) A virtual scene is a virtual scene displayed (or provided) when an application is executing on an electronic device. The virtual scene may be a simulation environment of the real world, or may be a semi-simulated and semi-fictional virtual scene, or may be a purely fictional virtual scene. The virtual scene may be any one of a two-dimensional virtual scene, a 2.5-dimensional virtual scene, and a three-dimensional virtual scene, and the embodiments of the present application do not limit the dimension of the virtual scene. For example, the virtual scene may include the sky, land, sea, etc., and the land may include environmental elements such as deserts and cities. The user can control a virtual object to move in the virtual scene. It should be understood that the above virtual scene may also be referred to as a virtual space.

7) A virtual object is an object that interacts in a virtual scene, and is controlled by a user or a robot program (for example, an artificial intelligence-based robot program), and can be an object that is stationary, moves, and performs various behaviors in the virtual scene, such as various characters in a game.

Currently, when a user interacts with a virtual object in a virtual scene, the interaction is usually implemented by a virtual ray emitted by means of a handle, a gesture, or the like, that is, the ray interaction is used to perform various interactions with the virtual object. However, a display form of the virtual ray emitted in the virtual scene is usually simple, resulting in a poor interactive experience of the user based on the virtual ray and the virtual object.

To solve the above technical problem, the inventive concept of the present application is: The position of the controller that emits the virtual ray is obtained, and the display form of the virtual ray is dynamically adjusted based on the position of the controller, thereby optimizing the visual effect of the virtual ray, thereby meeting the requirement for interaction diversity of the user, and improving the human-computer interaction experience of the user.

Some embodiments are used below to describe the technical solutions of the present application in detail. The embodiments described below can be combined with each other, and the same or similar concepts or processes may not be described again in some embodiments.

FIG. 1 is a flowchart of a display control method according to an embodiment of the present application. The display control method provided in this embodiment of the present application may be performed by a display control apparatus. The display control apparatus may be composed of hardware and/or software, and may be integrated in an electronic device. In the present application, the electronic device may be optionally any terminal device that can provide a virtual scene to a user, such as a tablet computer, a personal desktop computer, a notebook computer, an XR device, and other wearable devices. The present application does not limit the type of electronic device. For the sake of clearer description of the technical solution disclosed in the embodiments of the present application, the following will take the electronic device being an XR device as an example for specific description.

As shown in FIG. 1, the method includes the following steps:

S101: Obtain real-time position information of a controller, where the controller is configured to emit a virtual ray pointing to any virtual object in a virtual space.

It should be understood that the virtual space may be any virtual scene provided by the XR device to the user. The virtual scene may be a personalized virtual scene constructed by the user based on a virtual scene construction function provided by the XR device, or may be any virtual scene selected by the user from a plurality of existing virtual scenes provided by the XR device. The present application does not limit the virtual space.

In addition, to meet the requirement of the user for interacting with the virtual space, at least one virtual object may be constructed in the virtual space, so that the user can interact with the virtual object to achieve the effect of interacting with the virtual space. In the present application, the virtual object may be an object that can remain stationary, move, or perform various behaviors in the virtual space, such as a virtual character, a virtual panel, a virtual control, and other virtual objects.

Optionally, when the user uses the XR device, the user can obtain a required virtual space through the XR device and enter the virtual space. After entering the virtual space, the user can emit a virtual ray in the virtual space by a controller that supports emitting the virtual ray, and determine a virtual object to be interacted with by means of the virtual ray. Then, the user interacts with the virtual object to be interacted with by manipulating the virtual ray.

The controller may be a real handheld device such as a real handle, a real bracelet, or a real finger ring that is in communication connection with the XR device, or may be a real hand of the user. The real handheld device includes a left handheld device and a right handheld device, and the corresponding real hand of the user includes a real left hand and a real right hand.

Furthermore, to simulate an interactive operation of the user in the virtual space by the real handheld device and/or the real hand, the present application may further construct a handheld device model corresponding to the real handheld device and/or a hand model corresponding to the real hand in the virtual space according to the real handheld device and/or the real hand. The handheld device model includes a left handheld device model and a right handheld device model, and the corresponding hand model includes a left hand model and a right hand model.

The movement and manipulation action of the handheld device model correspond to the movement and manipulation action of the corresponding real handheld device. Similarly, the movement and gesture action of the hand model correspond to the movement and gesture action of the corresponding real hand.

In other words, the movement and manipulation action of the handheld device model follow the movement and manipulation action of the real handheld device, and the movement and gesture action of the hand model follow the movement and gesture action of the real hand.

It should be noted that the real handheld device, the real hand of the user, the handheld device model, and the hand model may be displayed in the virtual space in a paired form, or may be displayed in the virtual space in a single display form. For example, a left hand model and a right hand model may be displayed in the virtual space, or only the left hand model or only the right hand model may be displayed. The present application does not limit the display form of the controller in the virtual space.

In some optional embodiments, when the user emits a virtual ray pointing to any virtual object in the virtual space by the controller, the XR device may obtain real-time pose information of the controller, and then obtain real-time position information and real-time posture information of the controller based on the real-time pose information of the controller. Then, a virtual ray pointing to the virtual object is generated by using the determined real-time position information as a start point of the virtual ray and the determined real-time posture information as a direction of the virtual ray. The virtual object pointed to by the virtual ray may be a to-be-interacted object that needs to be interacted with by the user.

In the present application, the obtaining real-time pose information of the controller may include the following methods:

Method 1: When the controller is a handheld device, because a device or apparatus for measuring pose information of the handheld device is usually deployed in the handheld device, the real-time pose information of the controller may be obtained by obtaining real-time pose information sent by a pose measurement apparatus on the handheld device.

The pose measurement apparatus may be, but is not limited to, an inertial measurement unit (IMU), a pose sensor, and other devices capable of measuring pose information. This is not limited in the present application.

Method 2: When the controller is a hand of the user, the real-time pose information of the controller may be obtained by acquiring an ambient image including the hand of the user and performing image recognition and processing based on the ambient image.

In consideration of the fact that the type of the controller is a handheld device or a hand of the user, when the virtual ray is generated based on the real-time pose information of the controller in the present application, the virtual ray may also be generated in different manners according to the type of the controller. Optionally, the following situations are included:

In a first situation, when the type of the controller is a handheld device, a position where a pose measurement apparatus is located in the handheld device may be used as a start point of the virtual ray, and a positive direction of the pose measurement apparatus may be used as a direction of the virtual ray, to generate a virtual ray in the virtual space.

The positive direction of the pose measurement apparatus may be determined by using a direction in which the pose measurement apparatus faces the virtual space as the positive direction, or any direction may be used as the positive direction of the pose measurement apparatus. This is not limited in the present application.

In a second situation, when the type of the controller is a hand of the user, a specific point on the hand of the user may be used as a start point of the virtual ray, and a direction in which the start point faces the virtual space may be used as a direction of the virtual ray, to generate a virtual ray in the virtual space.

In consideration of the fact that the hand of the user may be in different states, such as a naturally slightly open state or a fist state, the start point of the virtual ray may also be selected according to the state of the hand of the user in the present application.

As an optional implementation, a state of the hand of the user is determined. When the hand of the user is in a natural state, for example, fingers are in a slightly open state, a palm position on the hand of the user is higher in stability than other hand positions. Therefore, the palm position on the hand of the user may be used as the start point of the virtual ray. When the hand of the user is in a specific gesture state, for example, a single-finger pressing state, a fingertip position of an extended finger may be used as the start point of the virtual ray. In this way, the requirement for generating the virtual ray when the hand of the user is in different states can be met.

When a quantity of extended fingers is more than one, a fingertip position of any finger may be randomly selected as the start point of the virtual ray, or a fingertip position of a finger at a middle position may be selected from the more than one finger as the start point of the virtual ray. This is not limited in the present application.

Figure 2:
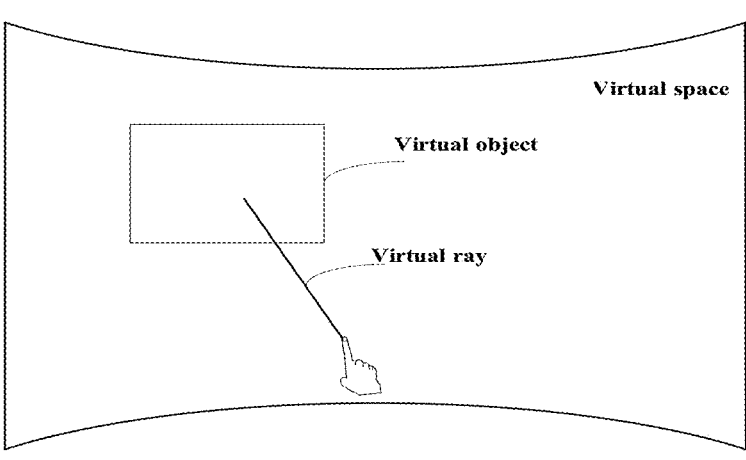
FIG. 2 is a schematic diagram of visibly displaying a virtual ray in a virtual space according to an embodiment of the present application.

In some optional embodiments, the virtual ray emitted by the controller may also be displayed in the virtual space in a visible display manner, so that the user can intuitively know the virtual object (the to-be-interacted object) pointed to by the virtual ray based on the visibly displayed virtual ray. A specific display manner may be shown in FIG. 2.

S102: Determine a target display form of the virtual ray according to the real-time position information of the controller.

Generally, an interaction region of each virtual object in the virtual space may be determined based on a distance between the user and the virtual object, that is, a region between the user and the virtual object may be used as the interaction region. However, when the user interacts with the virtual object by using ray interaction, no matter how a relative position between the user and the virtual object changes, the virtual ray displayed in the virtual space always remains in a display form, so that the display form of the virtual ray is relatively simple, resulting in a poor interactive experience of human-computer interaction.

For this reason, the present application may divide an interaction region of the virtual object into a near field region and a far field region. Then, the target display form of the virtual ray is determined according to a relationship between the real-time position information of the controller and the near field region and the far field region of the virtual object, to adjust the display form of the virtual ray based on the target display form, so that the display form of the virtual ray can dynamically change with the position of the controller, to enrich the display form of the virtual ray. Therefore, when a relative position between the user and the virtual object changes, the user can understand a distance change between the user and the virtual object through different display forms of the virtual ray, thereby improving the accuracy and fluency of interaction between the user and the virtual object.

Because there are many types of virtual objects in the virtual space, for example, a virtual object of an interface and a control, and a virtual object of a character or another object. For the virtual object of the interface and the control, the user can interact with the virtual object only when seeing the virtual object from the front, but for the virtual object of the character or the another object, as long as the user can see the virtual object, no matter from the front, a side, or the back, the user can interact with the virtual object by using the virtual ray. Therefore, the present application may further perform an operation of dividing the interaction region of the virtual object into the near field region and the far field region according to the type of the virtual object.

Figure 3A:
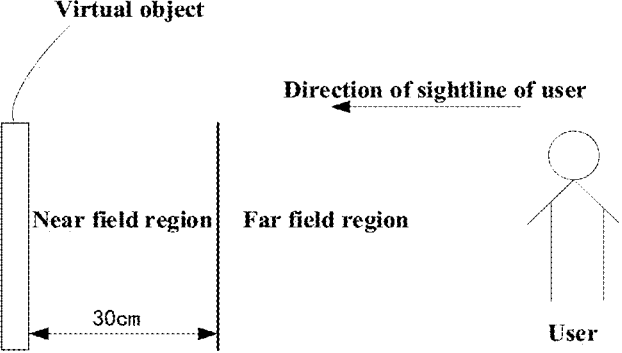
FIG. 3a is a side view of dividing an interaction region of a virtual object into a near field region and a far field region according to an embodiment of the present application.
Figure 3B:
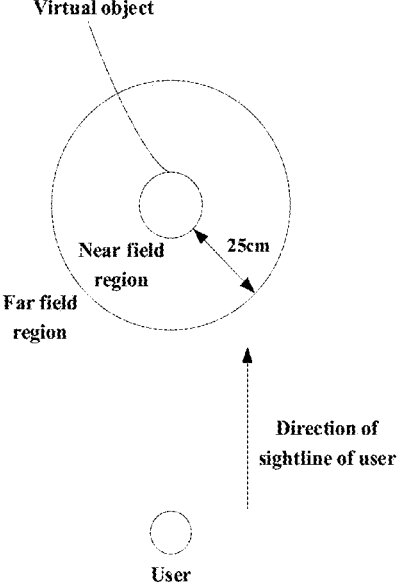
FIG. 3b is a top view of dividing an interaction region of a virtual object into a near field region and a far field region according to another embodiment of the present application.

As an optional implementation, when the virtual object is a virtual character and another non-interface or non-control object, the interaction region of this type of virtual object may be divided into the near field region and the far field region, as shown in FIG. 3*a*. When the virtual object is a virtual interface or a control on a virtual interface, or the like, the interaction region of this type of virtual object may be divided into the near field region and the far field region, as shown in FIG. 3b.

In the present application, when the interaction region of the virtual object is divided into the near field region and the far field region, the near field region may be a region range at a preset distance from the virtual object, and the far field region is a region other than the near field region. For example, assuming that the preset distance is 30 cm, the near field region of the virtual object may be a region range within 30 cm, and the far field region is a region range greater than 30 cm.

It should be noted that the preset distance is an adjustable parameter, and is specifically flexibly set based on an interaction requirement. For example, the preset distance is 25 cm or 50 cm. This is not limited in the present application.

In some optional embodiments, after the user emits the virtual ray in the virtual space by using the controller, the present application may further obtain real-time pose information of the controller, and obtain the real-time position information of the controller from the real-time pose information of the controller. Then, the target display form of the virtual ray may be determined based on the real-time position information of the controller.

As an optional implementation, determining the target display form of the virtual ray may include the following steps:

Step 11: Determine whether the real-time position information of the controller is located in the near field region of the virtual object. If the real-time position information of the controller is located in the near field region of the virtual object, perform step 12; or else, perform step 13.

Optionally, a near field region boundary position point of the virtual object may be first determined, and the real-time position information of the controller is compared with the near field region boundary position point of the virtual object. If the real-time position information of the controller is located in a position interval formed by the near field region boundary position point of the virtual object, it is determined that the real-time position information of the controller is located in the near field region of the virtual object. If the real-time position information of the controller is not located in the position interval formed by the near field region boundary position point of the virtual object, but is located in a position interval formed by a far field region boundary position point of the virtual object, it is determined that the real-time position information of the controller is located in the far field region of the virtual object.

The virtual object may be understood as a virtual object pointed to by the virtual ray.

Step 12: When it is determined that the real-time position information of the controller is located in the near field region of the virtual object, obtain a display form of the virtual ray in the near field region, and use the display form as the target display form of the virtual ray.

To enrich the display form of the virtual ray, different display forms may be set for the virtual ray based on the near field region and the far field region corresponding to the virtual object in the present application. Therefore, when it is determined that the real-time position information of the controller is located in the near field region of the virtual object, the display form of the virtual ray in the near field region may be obtained, and the display form is determined as the target display form of the virtual ray.

Because the controller that emits the virtual ray in the present application may be a handheld device or a hand of the user, when it is determined that the real-time position information of the controller is located in the near field region of the virtual object, the display form of the virtual ray in the near field region may be obtained according to the type of the controller, to obtain the target display form of the virtual ray.

In some optional embodiments, obtaining the display form of the virtual ray in the near field region according to the type of the controller includes one of the following:

1) When the controller is a first type of controller, obtaining the display form of the virtual ray in the near field region as a virtual pointer form.

2) When the controller is a second type of controller, obtaining the display form of the virtual ray in the near field region as a form with a preset transparency.

In the present application, the form with the preset transparency specifically refers to an invisible form when a transparency of the virtual ray is 100%. That is, when the controller is the second type of controller, in the near field region, the virtual ray is invisible to the user, that is, the virtual ray is completely transparent.

The first type of controller is specifically a handheld controller, and the handheld controller is a real handheld device or a handheld device model. The second type of controller is specifically a hand of the user, and the hand of the user is a real hand of the user or a hand model.

Figures 4A, 4B:
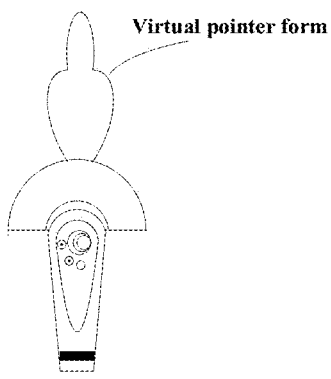
FIG. 4a is a schematic diagram of a display form of a virtual ray in a near field region according to an embodiment of the present application.
FIG. 4b is a schematic diagram of another display form of a virtual ray in a near field region according to an embodiment of the present application.

For example, assuming that the controller is the handheld device model, the display form of the virtual ray in the near field region is the virtual pointer form, as shown in FIG. 4a. For another example, assuming that the controller is the real hand of the user, the display form of the virtual ray in the near field region is the form with the preset transparency, as shown in FIG. 4b.

Step 13: When it is determined that the real-time position information of the controller is located in the far field region of the virtual object, obtain a display form of the virtual ray in the far field region, and use the display form as the target display form of the virtual ray.

Because the controller that emits the virtual ray in the present application may be a handheld device or a hand of the user, when it is determined that the real-time position information of the controller is located in the far field region of the virtual object, the display form of the virtual ray in the far field region may be obtained according to the type of the controller, to obtain the target display form of the virtual ray.

In some optional embodiments, obtaining the display form of the virtual ray in the far field region according to the type of the controller includes one of the following:

1) When the controller is a first type of controller, obtaining the display form of the virtual ray in the far field region as a linear form.

2) When the controller is a second type of controller, obtaining the display form of the virtual ray in the far field region as a preset form.

Figure 5:
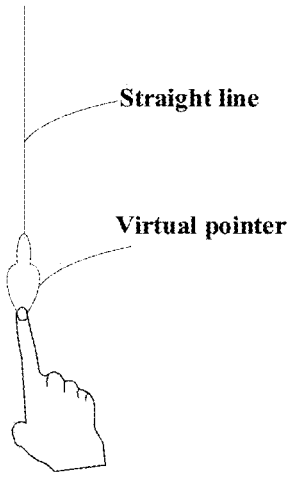
FIG. 5 is a schematic diagram of a preset form according to an embodiment of the present application.

The preset form may include two parts: a virtual pointer and a straight line. That is, the display form of the virtual ray in the far field region includes the straight line and the virtual pointer, as shown in FIG. 5.

The first type of controller is specifically a handheld controller, and the handheld controller is a real handheld device or a handheld device model. The second type of controller is specifically a hand of the user, and the hand of the user is a real hand of the user or a hand model.

For example, assuming that the controller is the real handheld device, the display form of the virtual ray in the far field region is the linear form. For another example, assuming that the controller is the hand model, the display form of the virtual ray in the far field region is the preset form including the virtual pointer and the straight line.

It can be understood that the display form of the virtual ray in the near field region of the virtual object is different from the display form of the virtual ray in the far field region of the virtual object in the present application.

S103: Adjust a display form of the virtual ray according to the target display form of the virtual ray.

After the target display form of the virtual ray is obtained, the display form of the virtual ray may be adjusted based on the target display form, so that an adjusted display form of the virtual ray corresponds to the real-time position information of the controller, to implement an effect of dynamically adjusting the display form of the virtual ray based on the real-time position information of the controller.

For example, assuming that a display state of the virtual ray is the linear form and the controller that emits the virtual ray is the handheld device model, when it is determined, based on the real-time position information of the handheld device, that the controller is located in the near field region of the virtual object, the virtual ray in the linear form is adjusted to the virtual ray in the virtual pointer form.

In some optional embodiments, when the target display form of the virtual ray is the linear form, after the display form of the virtual ray is adjusted to the linear form, the virtual ray in the linear form may be further displayed in a fade-in manner at a preset proportion. In this way, it can be avoided that when the virtual ray that is displayed completely intersects with the virtual object, an intersection point blocks some content on the virtual object, resulting in that the user cannot view complete information on the virtual object.

The preset proportion is an adjustable parameter, and may be specifically flexibly adjusted based on a fade-in display requirement of the virtual ray. This is not limited in the present application. For example, the preset proportion is 1:0.5, that is, a region that is one half of a total ray length of the virtual ray is used as a fade-in region.

Figure 6:
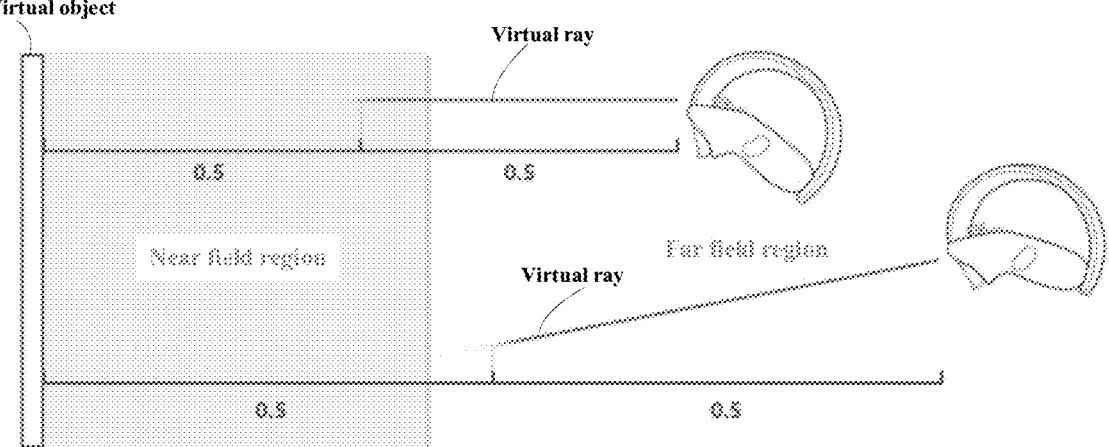
FIG. 6 is a side view of fade-in display of a virtual ray whose display form is adjusted according to an embodiment of the present application.

For example, assuming that the controller is the first type of controller, the real-time position information of the controller is located in the far field region of the virtual object, a fade-in display proportion is 1:0.5, and when the target display form of the virtual ray is the linear form, the virtual ray is adjusted to the linear form, and the virtual ray in the linear form is further displayed in the fade-in manner at a ray fade-in region that is one half of a total virtual ray length. For details, refer to FIG. 6.

It should be noted that performing fade-in display on the virtual ray in the linear form is an optional item in the present application. In other words, the virtual ray in the linear form may be displayed in the fade-in manner or may not be displayed in the fade-in manner according to an actual interaction requirement. This is not limited in the present application.

According to the technical solution disclosed in the embodiments of the present application, the real-time position information of the controller is obtained, to determine the target display form of the virtual ray according to the real-time position information of the controller, and then the display form of the virtual ray in the virtual space is adjusted based on the target display form. In this way, according to the position of the controller that emits the virtual ray, the display form of the virtual ray is dynamically adjusted, so that a requirement for interaction diversity of the user is met, and a human-computer interaction experience of the user is improved.

On the basis of the foregoing embodiments, considering that the real-time position information of the controller may be located in the far field region of the virtual object at a previous moment, and located in the near field region of the virtual object at a current moment, or located in the near field region of the virtual object at the previous moment, and located in the far field region of the virtual object at the current moment, in the foregoing case, the display form of the virtual ray is directly adjusted based on the target display form determined based on the real-time position information of the controller, which is relatively sudden for the user, that is, the display form is one form at the previous moment, and is another form at the current moment, which causes a visual impact on the user, resulting in a poor experience of the user.

To solve this problem, the present application may further divide the near field region and the far field region of each virtual object in the virtual space, so that the display form adjustment process of the virtual ray based on the real-time position of the controller has a transition effect, thereby improving the smoothness of the display form adjustment process of the virtual ray, so that the adjustment process is not sudden, to improve the visual experience of the user. The following further describes the display control method disclosed in the embodiments of the present application with reference to FIG. 7.

As shown in FIG. 7, the method may include the following steps:

S201: Obtain real-time position information of a controller, where the controller is configured to emit a virtual ray pointing to any virtual object in a virtual space.

S202: Determine a movement trajectory, and/or a movement direction, and a movement speed of the controller according to the real-time position information of the controller.

S203: When it is determined, according to the real-time position information of the controller, that the controller enters a first form transformation sub-region from the far field region, and/or the movement direction of the controller is to move from the far field region to the near field region, and the movement speed of the controller is greater than a preset speed, control the virtual ray to perform dynamic transformation from a first display form to a second display form.

S204: When it is determined, according to the real-time position information of the controller, that the controller exits from the near field region to a second form transformation sub-region, and/or the movement direction of the controller is to move from the near field region to the far field region, and the movement speed of the controller is greater than the preset speed, control the virtual ray to perform dynamic transformation from the second display form to the first display form.

The first display form is a display form of the virtual ray in the far field region, and the second display form is a display form of the virtual ray in the near field region.

Figure 8A:
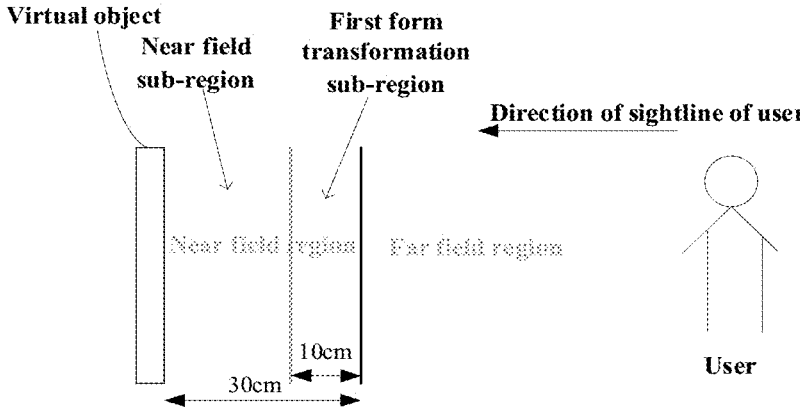
FIG. 8a is a side view of dividing a near field region of a virtual object into a first form transformation sub-region and a near field sub-region according to an embodiment of the present application.
Figure 8B:
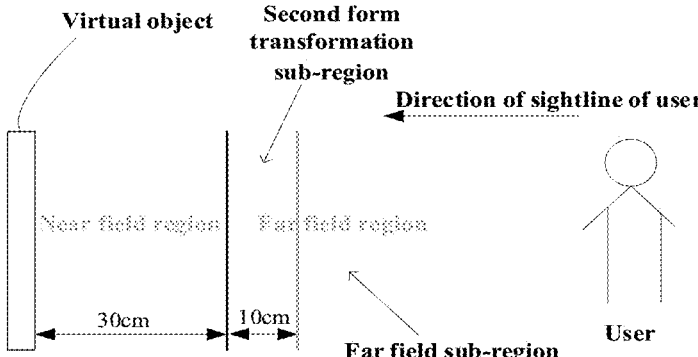
FIG. 8b is a side view of dividing a far field region of a virtual object into a second form transformation sub-region and a far field sub-region according to an embodiment of the present application.

To make the display form adjustment process of the virtual ray smoother, more natural, and less sudden, the present application may divide the near field region of each virtual object in the virtual space into a first form transformation sub-region and a near field sub-region, as shown in FIG. 8a, and divide the far field region of each virtual object into a second form transformation sub-region and a far field sub-region, as shown in FIG. 8b.

The further division of the near field region and the far field region may be flexibly set based on the adjustment smoothness of the display form of the virtual ray. This is not limited in the present application. In other words, when a high display form switching smoothness of the virtual ray is required, the first form transformation sub-region and the second form transformation sub-region may be divided with larger areas. In contrast, when a low display form switching smoothness of the virtual ray is required, the first form transformation sub-region and the second form transformation sub-region may be divided with smaller areas.

Then, after the real-time position information of the controller is obtained, a movement trajectory, and/or a movement direction, and a movement speed of the controller may be determined based on the real-time position information of the controller. Then, the display form of the virtual ray is adjusted based on the movement trajectory, and/or the movement direction, and the movement speed of the controller.

The movement trajectory and the movement direction of the controller are determined based on the real-time position information of the controller. The real-time position information may be sorted according to a time sequence in which the position is obtained, to obtain the movement trajectory of the controller. In addition, based on the sorted real-time position information and the real-time position information of adjacent positions, the movement direction of the controller may be determined.

The movement speed of the controller is determined based on the real-time position information of the controller. The adjacent real-time position information and time information about a time when the controller moves from a previous real-time position information to current real-time position information of the adjacent real-time position information may be obtained. Then, based on the adjacent real-time position information, a movement distance of the controller moving from the previous real-time position information to the current real-time position information is calculated by using a distance formula for two points. Then, the movement distance is divided by the time information, to calculate the movement speed of the controller.

Figure 9A:
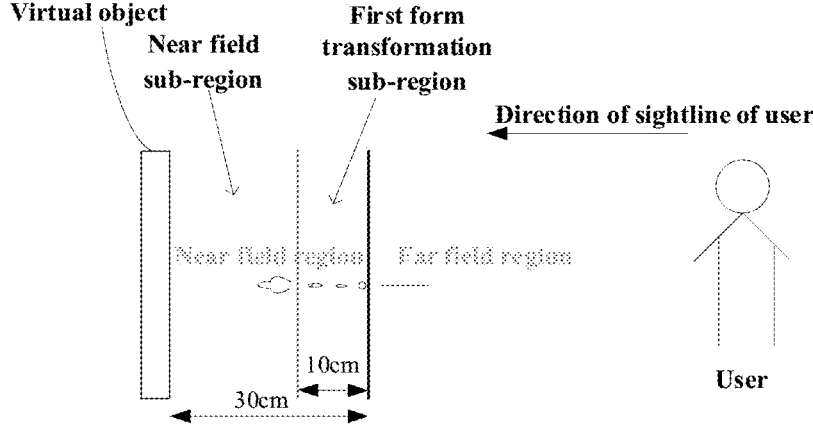
FIG. 9a is a side view of controlling a display form of a virtual ray to perform dynamic transformation according to an embodiment of the present application.

In some optional embodiments, adjusting the display form of the virtual ray based on the movement trajectory, and/or the movement direction, and the movement speed of the controller includes one of the following:

In a first case, when it is determined, based on the movement trajectory, and/or the movement direction, and the movement speed of the controller, that the controller enters the first form transformation sub-region from the far field region of the virtual object, and/or the movement direction of the controller is to move from the far field region of the virtual object to the near field region, and the movement speed of the controller is greater than a preset speed, it indicates that the user manipulates the virtual ray to approach the pointed virtual object by the controller. In this case, the virtual ray may be controlled, based on the real-time position information of the controller, to perform dynamic transformation from the first display form to the second display form. For a specific transformation process, refer to FIG. 9a.

When the real-time position information of the controller enters the near field sub-region from the first form transformation region, the virtual ray in the second display form is displayed in the near field sub-region.

Figure 9B:
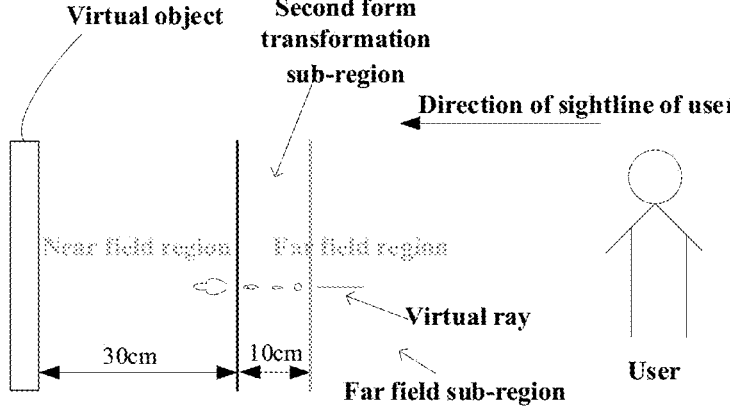
FIG. 9b is a side view of controlling a display form of a virtual ray to perform dynamic adjustment according to another embodiment of the present application.

In a second case, when it is determined, based on the movement trajectory, and/or the movement direction, and the movement speed of the controller, that the controller exits from the near field region of the virtual object to the second form transformation sub-region, and/or the movement direction of the controller is to move from the near field region of the virtual object to the far field region and the movement speed of the controller is greater than the preset speed, it indicates that the user manipulates the virtual ray to move away from the virtual object by the controller. In this case, the virtual ray may be controlled, based on the real-time position information of the controller, to perform dynamic transformation from the second display form to the first display form. For a specific transformation process, refer to FIG. 9b.

When the real-time position information of the controller enters the far field sub-region from the second form transformation sub-region, the virtual ray in the first display form is displayed in the far field sub-region.

The preset speed may be set based on a normal movement speed of the controller. For example, when the normal movement speed of the controller is V1, the preset speed may be optionally any speed value greater than V1. In other words, during a movement process of the controller at the normal movement speed, it is detected that the controller suddenly accelerates, so that the movement speed is greater than the normal movement speed. It indicates that the user may need to interact with the pointed virtual object. In this case, the virtual ray may be controlled to perform dynamic transformation from the first display form to the second display form, so as to provide a visual feedback to the user to respond to the manipulation operation of the user.

In the present application, the first display form may include a linear form and a preset form according to the type of the controller. The controller corresponding to the linear form is a first type of controller, and the controller corresponding to the preset form is a second type of controller.

Similarly, the second display form may include a virtual pointer form and a form with a preset transparency according to the type of the controller. The virtual pointer form corresponds to the first type of controller, and the form with the preset transparency corresponds to the second type of controller.

According to the technical solution disclosed in the embodiments of the present application, the real-time position information of the controller is obtained, to determine the target display form of the virtual ray according to the real-time position information of the controller, and then the display form of the virtual ray in the virtual space is adjusted based on the target display form. In this way, according to the position of the controller that emits the virtual ray, the display form of the virtual ray is dynamically adjusted, so that a requirement for interaction diversity of the user is met, and a human-computer interaction experience of the user is improved. In addition, in the present application, the near field region of the virtual object is divided into the first form transformation sub-region and the near field sub-region, and the far field region of the virtual object is divided into the second form transformation sub-region and the far field sub-region, so that when the display form of the virtual ray is adjusted based on the real-time position of the controller, the display form of the virtual ray can be gradually adjusted in the form transformation sub-region instead of directly switching the display form of the virtual ray from one display form to another display form, so that the display form adjustment process of the virtual ray is smooth, natural, and more smooth, thereby improving the visual experience of the user.

In some optional implementation scenarios, considering that when the virtual ray intersects with the virtual object, visual indication information corresponding to the virtual ray is displayed at an intersection position. The visual indication information may be information such as a cursor that is used to provide a prompt. The present application does not limit a specific display form of the visual indication information. Therefore, while the display form of the virtual ray is adjusted based on the real-time position information of the controller, the visual indication information corresponding to the virtual ray may also be adjusted, so that the display forms of the virtual ray and the visual indication information always maintain visual consistency, thereby helping the user obtain a consistent and comfortable visual experience. The following describes a process of adjusting the visual indication information corresponding to the virtual ray according to an embodiment of the present application with reference to FIG. 10.

As shown in FIG. 10, the method may include the following steps:

S301: Obtain real-time position information of a controller, where the controller is configured to emit a virtual ray pointing to any virtual object in a virtual space.

S302: Determine a target display form of the virtual ray and a target display form of visual indication information according to the real-time position information of the controller, where the visual indication information corresponds to the virtual ray.

For determining the target display form of the virtual ray, refer to the foregoing embodiment. Details are not described herein again.

In some optional embodiments, determining the target display form of the visual indication information corresponding to the virtual ray according to the real-time position information of the controller may include the following steps:

Step 21: Determine whether the real-time position information of the controller is located in the near field region of the virtual object. If the real-time position information of the controller is located in the near field region of the virtual object, perform step 22; or else, perform step 23.

Step 22: When it is determined that the real-time position information of the controller is located in the near field region of the virtual object, obtain a third display form of the visual indication information on the virtual object, and use the third display form as the target display form of the visual indication information.

Step 23: When it is determined that the real-time position information of the controller is located in the far field region of the virtual object, obtain a fourth display form of the visual indication information on the virtual object, and use the fourth display form as the target display form of the visual indication information.

It should be understood that the third display form and the fourth display form are two different display forms.

In the present application, the third display form may be, but is not limited to, a halo form, a circle, a hollow arrow, etc., and the fourth display form may be, but is not limited to, a solid circle, a solid arrow, a ring, etc. As long as the third display form is different from the fourth display form, the present application does not specifically limit the third display form and the fourth display form.

For example, the third display form shown in FIG. 11*a* may be a halo form, and the fourth display form shown in FIG. 11*b* may be a ring form.

In some optional embodiments, a near field region boundary position point of the virtual object may be first determined, and the real-time position information of the controller is compared with the near field region boundary position point of the virtual object. If the real-time position information of the controller is located in a position interval formed by the near field region boundary position point of the virtual object, it is determined that the real-time position information of the controller is located in the near field region of the virtual object. If the real-time position information of the controller is not located in the position interval formed by the near field region boundary position point of the virtual object, but is located in a position interval formed by a far field region boundary position point of the virtual object, it is determined that the real-time position information of the controller is located in the far field region of the virtual object.

When it is determined that the controller is located in the near field region of the virtual object, the third display form of the visual indication information on the virtual object may be obtained as the target display form of the visual indication information corresponding to the virtual ray. When it is determined that the controller is located in the far field region of the virtual object, the fourth display form of the visual indication information on the virtual object may be obtained as the target display form of the visual indication information corresponding to the virtual ray.

S303: Adjust the display form of the virtual ray according to the target display form of the virtual ray, and adjust a display form of the visual indication information according to the target display form of the visual indication information.

After the target display form of the virtual ray and the target display form of the visual indication information are obtained, in the present application, the display form of the virtual ray may be adjusted based on the target display form of the virtual ray, and the display form of the visual indication information is adjusted based on the target display form of the visual indication information, to implement a synchronous and dynamic adjustment effect on the display forms of the virtual ray and the visual indication information corresponding to the virtual ray based on the real-time position information of the controller.

In other words, when the controller is located in different interaction regions of the virtual object, the visual indication information corresponding to the virtual ray also correspondingly has different display forms, to implement synchronous adjustment of the display form of the visual indication information while the display form of the virtual ray is adjusted according to the position information of the controller, to implement the synchronous adjustment effect of the virtual ray and the visual indication information, so that visual consistency between the virtual ray and the visual indication information can be maintained.

For example, assuming that the current display form of the virtual ray is the linear form, and the current display form of the visual indication information is the ring form, when the target display form of the virtual ray is the virtual pointer, and the target display form of the visual indication information is the halo form, the virtual ray in the linear form may be adjusted to the virtual pointer form, and the visual indication information in the ring form may be adjusted to the halo form.

In some optional embodiments, when the user needs to interact with the pointed virtual object by means of the virtual ray and the visual indication information, the user may input interaction information by a handheld device or a hand of the user. When the handheld device or a gesture collection camera that collects a gesture of the user detects that the user inputs the interaction information for the virtual object, the interaction information may be sent to the XR device, so that the XR device parses the interaction information to obtain a specific interaction operation of the user with the virtual object. Then, the display form of the virtual ray and the display form of the visual indication information corresponding to the virtual ray are adjusted based on the specific interaction operation, to feed back the interaction with the virtual object to the user through a visual effect.

In the present application, adjusting the display forms of the virtual ray and the visual indication information corresponding to the virtual ray optionally includes adjusting a display color and/or a display style of the virtual ray and the visual indication information. Certainly, in addition to adjusting the display color and/or the display style, the present application may further adjust transparency, a size, and the like of the virtual ray and the visual indication information. This is not limited in the present application.

Considering that there may be a plurality of specific interaction operations between the user and the virtual object, in the present application, for each interaction operation, one or more display forms may be set for the virtual ray and the visual indication information. In other words, a relationship between the interaction operation and the display forms of the virtual ray and the visual indication information is a one-to-one relationship or a one-to-many relationship, and display forms corresponding to each interaction operation are different.

For example, assuming that the interaction operation triggered by the user is to control the visual indication information to hover over the virtual object, a display color of the virtual ray and the visual indication information is determined as white according to the hover event. For another example, assuming that the interaction operation triggered by the user is to control the visual indication information to select the virtual object, a display color of the virtual object and the visual indication information is determined as blue according to a selection event, and a display style is a bold virtual ray and visual indication information.

Considering that a specific interaction operation between the user and the virtual object may be a drag operation, when the virtual object is an object with a specific weight, when the virtual object is dragged by manipulating the virtual ray, the present application may further perform visual physical display of bending the virtual ray based on a mass of the virtual object, so that the user can know, based on the bent virtual ray, that the currently dragged virtual object has a specific weight.

According to the technical solution disclosed in the embodiments of the present application, the real-time position information of the controller is obtained, to determine the target display form of the virtual ray according to the real-time position information of the controller, and then the display form of the virtual ray in the virtual space is adjusted based on the target display form. In this way, according to the position of the controller that emits the virtual ray, the display form of the virtual ray is dynamically adjusted, so that a requirement for interaction diversity of the user is met, and a human-computer interaction experience of the user is improved. In addition, in the present application, the target display form of the visual indication information corresponding to the virtual ray is determined based on the real-time position of the controller, and the display form of the visual indication information is adjusted based on the target display form, so that the display forms of the virtual ray and the visual indication information maintain visual consistency, thereby helping the user obtain a consistent and comfortable visual experience.

The following further describes the display form adjustment process of the visual indication information disclosed in the embodiments of the present application with reference to FIG. 12. As shown in FIG. 12, the method may include the following steps:

S401: Obtain real-time position information of a controller, where the controller is configured to emit a virtual ray pointing to any virtual object in a virtual space.

S402: Determine a movement trajectory, and/or a movement direction, and a movement speed of the controller according to the real-time position information of the controller.

S403: When it is determined, according to the real-time position information of the controller, that the controller enters a first form transformation sub-region from the far field region, and/or the movement direction of the controller is to move from the far field region to the near field region, and the movement speed of the controller is greater than a preset speed, control the virtual ray to perform dynamic transformation from a first display form to a second display form, and control visual indication information to perform dynamic transformation from a fourth display form to a third display form.

S404: When it is determined, according to the real-time position information of the controller, that the controller exits from the near field region to a second form transformation sub-region, and/or the movement direction of the controller is to move from the near field region to the far field region, and the movement speed of the controller is greater than the preset speed, control the virtual ray to perform dynamic transformation from the second display form to the first display form, and control the visual indication information to perform dynamic transformation from the third display form to the fourth display form.

To make the display form adjustment process of the virtual ray and the visual indication information smoother, more natural, and less sudden, the present application may divide the near field region of the virtual object into a first form transformation sub-region and a near field sub-region, as shown in FIG. 8*a*, and divide the far field region of the virtual object into a second form transformation sub-region and a far field sub-region, as shown in FIG. 8*b*.

Therefore, after the real-time position information of the controller is obtained, a movement trajectory, and/or a movement direction, and a movement speed of the controller may be determined based on the real-time position information of the controller. Then, the display form of the virtual ray and the display form of the visual indication information are adjusted based on the movement trajectory, and/or the movement direction, and the movement speed of the controller.

The movement trajectory and the movement direction of the controller are determined based on the real-time position information of the controller. The real-time position information may be sorted according to a time sequence in which the position is obtained, to obtain the movement trajectory of the controller. In addition, based on the sorted real-time position information and the real-time position information of adjacent positions, the movement direction of the controller may be determined.

The movement speed of the controller is determined based on the real-time position information of the controller. The adjacent real-time position information and time information about a time when the controller moves from a previous real-time position information to current real-time position information of the adjacent real-time position information may be obtained. Then, based on the adjacent real-time position information, a movement distance of the controller moving from the previous real-time position information to the current real-time position information is calculated by using a distance formula for two points. Then, the movement distance is divided by the time information, to calculate the movement speed of the controller.

Figure 13A:
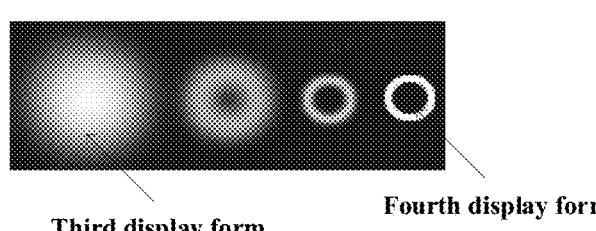
FIG. 13*a* is a side view of controlling a display form of visual indication information to perform dynamic transformation according to an embodiment of the present application.

In some optional embodiments, adjusting the display form of the virtual ray and the display form of the visual indication information based on the movement trajectory, and/or the movement direction, and the movement speed of the controller includes one of the following:

In a first case, when it is determined, based on the movement trajectory, and/or the movement direction, and the movement speed of the controller, that the controller enters the first form transformation sub-region from the far field region of the virtual object, and/or the movement direction of the controller is to move from the far field region of the virtual object to the near field region, and the movement speed of the controller is greater than a preset speed, it indicates that the user manipulates the virtual ray to approach the pointed virtual object by the controller. In this case, the virtual ray may be controlled, based on the real-time position information of the controller, to perform dynamic transformation from the first display form to the second display form. For a specific transformation process, refer to FIG. 9a. In addition, the visual indication information corresponding to the virtual ray may be controlled to perform dynamic transformation from the fourth display form to the third display form. For a specific transformation process, refer to FIG. 13a.

When the real-time position information of the controller enters the near field sub-region from the first form transformation region, the virtual ray in the second display form is displayed in the near field sub-region, and the visual indication information in the third display form is displayed on the virtual object.

Figure 13B:
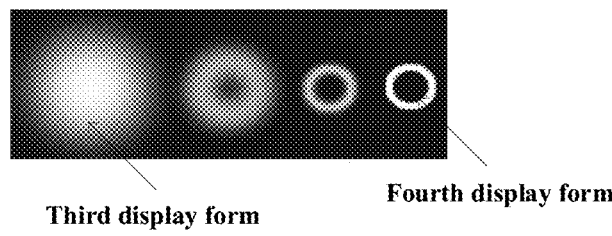
FIG. 13*b* is a side view of controlling a display form of visual indication information to perform dynamic adjustment according to another embodiment of the present application.

In a second case, when it is determined, based on the movement trajectory, and/or the movement direction, and the movement speed of the controller, that the controller exits from the near field region of the virtual object to the second form transformation sub-region, and/or the movement direction of the controller is to move from the near field region of the virtual object to the far field region, and the movement speed of the controller is greater than the preset speed, it indicates that the user manipulates the virtual ray to move away from the virtual object by the controller. In this case, the virtual ray may be controlled, based on the real-time position information of the controller, to perform dynamic transformation from the second display form to the first display form. For a specific transformation process, refer to FIG. 9b. In addition, the visual indication information corresponding to the virtual ray may be controlled to perform dynamic transformation from the third display form to the fourth display form. For a specific transformation process, refer to FIG. 13b.

When the real-time position information of the controller enters the far field sub-region from the second form transformation sub-region, the virtual ray in the first display form is displayed in the far field sub-region, and the visual indication information in the fourth display form is displayed on the virtual object.

According to the technical solution disclosed in the embodiments of the present application, the real-time position information of the controller is obtained, to determine the target display form of the virtual ray according to the real-time position information of the controller, and then the display form of the virtual ray in the virtual space is adjusted based on the target display form. In this way, according to the position of the controller that emits the virtual ray, the display form of the virtual ray is dynamically adjusted, so that a requirement for interaction diversity of the user is met, and a human-computer interaction experience of the user is improved. In addition, in the present application, the near field region of the virtual object is divided into the first form transformation sub-region and the near field sub-region, and the far field region of the virtual object is divided into the second form transformation sub-region and the far field sub-region, so that when the display form of the virtual ray and the display form of the visual indication information are adjusted based on the real-time position of the controller, the display form of the virtual ray and the display form of the visual indication information can be gradually adjusted in the form transformation sub-region instead of directly switching the display form of the virtual ray from one display form to another display form, so that the display form adjustment process of the virtual ray and the display form adjustment process of the visual indication information are smooth, natural, and more smooth, thereby improving the visual experience of the user.

Figure 14:
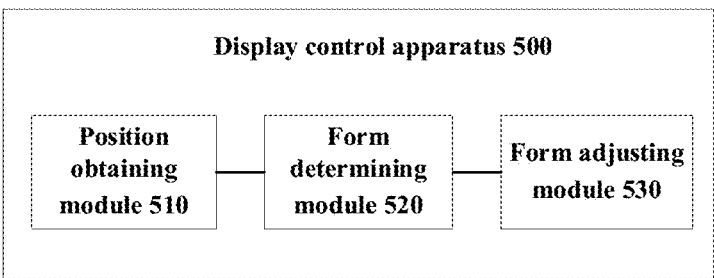
FIG. 14 is a schematic block diagram of a display control apparatus according to an embodiment of the present application.

A display control apparatus proposed in an embodiment of the present application is described below with reference to FIG. 14. FIG. 14 is a schematic block diagram of a display control apparatus according to an embodiment of the present application.

As shown in FIG. 14, the display control apparatus 500 includes a position obtaining module 510, a form determining module 520, and a form adjusting module 530.

The position obtaining module 510 is configured to obtain real-time position information of a controller, where the controller is configured to emit a virtual ray pointing to any virtual object in a virtual space;

the form determining module 520 is configured to determine a target display form of the virtual ray according to the real-time position information of the controller; and the form adjusting module 530 is configured to adjust a display form of the virtual ray according to the target display form of the virtual ray.

In an optional implementation of this embodiment of the present application, the virtual object includes a near field region and a far field region, and the form determining module 520 includes:

a first determining unit, configured to determine that the real-time position information of the controller is located in the near field region of the virtual object, obtain a display form of the virtual ray in the near field region, and use the display form as the target display form of the virtual ray; and a second determining unit, configured to determine that the real-time position information of the controller is located in the far field region of the virtual object, obtain a display form of the virtual ray in the far field region, and use the display form as the target display form of the virtual ray, where the display form of the virtual ray in the near field region is different from the display form of the virtual ray in the far field region.

In an optional implementation of this embodiment of the present application, the first determining unit is specifically configured to: when the controller is a first type of controller, obtain the display form of the virtual ray in the near field region as a virtual pointer form; or when the controller is a second type of controller, obtain the display form of the virtual ray in the near field region as a form with a preset transparency.

In an optional implementation of this embodiment of the present application, the second determining unit is specifically configured to: when the controller is the first type of controller, obtain the display form of the virtual ray in the far field region as a linear form; or when the controller is the second type of controller, obtain the display form of the virtual ray in the far field region as a preset form, where the preset form includes a virtual pointer and a straight line.

In an optional implementation of this embodiment of the present application, the near field region includes a first form transformation sub-region, and the apparatus 500 further includes:

a first transformation control module, configured to: when it is determined, according to the real-time position information of the controller, that the controller enters the first form transformation sub-region from the far field region, and/or a movement direction of the controller is to move from the far field region to the near field region, and a movement speed of the controller is greater than a preset speed, control the virtual ray to perform dynamic transformation from a first display form to a second display form, where the first display form is a display form of the virtual ray in the far field region, and the second display form is a display form of the virtual ray in the near field region.

In an optional implementation of this embodiment of the present application, the far field region includes a second form transformation sub-region, and the first transformation control module is further configured to:

when it is determined, according to the real-time position information of the controller, that the controller exits from the near field region to the second form transformation sub-region, and/or the movement direction of the controller is to move from the near field region to the far field region, and the movement speed of the controller is greater than the preset speed, control the virtual ray to perform dynamic transformation from the second display form to the first display form.

In an optional implementation of this embodiment of the present application, the apparatus 500 further includes:

a display module, configured to display the virtual ray in a fade-in manner when it is determined that the real-time position information of the controller is located in the far field region of the virtual object.

In an optional implementation of this embodiment of the present application, the form determining module 520 is further configured to determine a target display form of visual indication information according to the real-time position information of the controller, where the visual indication information corresponds to the virtual ray; and the form adjusting module 530 is further configured to adjust a display form of the visual indication information according to the target display form of the visual indication information.

In an optional implementation of this embodiment of the present application, the form determining module 520 further includes:

a third determining unit, configured to determine that the real-time position information of the controller is located in the near field region of the virtual object, obtain a third display form of the visual indication information on the virtual object, and use the third display form as the target display form of the visual indication information; and a fourth determining unit, configured to determine that the real-time position information of the controller is located in the far field region of the virtual object, obtain a fourth display form of the visual indication information on the virtual object, and use the fourth display form as the target display form of the visual indication information.

In an optional implementation of this embodiment of the present application, the near field region includes a first form transformation sub-region, and the apparatus 500 further includes:

a second transformation control module, configured to: when it is determined, according to the real-time position information of the controller, that the controller enters the first form transformation sub-region from the far field region, and/or the movement direction of the controller is to move from the far field region to the near field region, and the movement speed of the controller is greater than a preset speed, control the visual indication information to perform dynamic transformation from a fourth display form to a third display form.

In an optional implementation of this embodiment of the present application, the far field region includes a second form transformation sub-region, and the second transformation control module is further configured to:

when it is determined, according to the real-time position information of the controller, that the controller exits from the near field region to the second form transformation sub-region, and/or the movement direction of the controller is to move from the near field region to the far field region, and the movement speed of the controller is greater than the preset speed, control the visual indication information to perform dynamic transformation from the third display form to the fourth display form.

In an optional implementation of this embodiment of the present application, the form adjusting module 530 is further configured to: detect, by the controller, interaction information entered by a user, and adjust the display form of the virtual ray and the display form of the visual indication information corresponding to the virtual ray.

It should be understood that the apparatus embodiment may correspond to the foregoing method embodiment. For similar description, reference may be made to the method embodiment. To avoid repetition, details are not described herein again. Specifically, the apparatus 500 shown in FIG. 14 may perform the method embodiment corresponding to FIG. 1, and the foregoing and other operations and/or functions of each module in the apparatus 500 are respectively used to implement corresponding processes in the method in FIG. 1. For the sake of brevity, details are not described herein again.

The apparatus 500 in the embodiments of the present application is described above with reference to the accompanying drawings from the perspective of a functional module. It should be understood that the functional module may be implemented in the form of hardware, may be implemented by instructions in the form of software, or may be implemented by a combination of hardware and software modules. Specifically, each step in the method embodiment in the first aspect in the embodiments of the present application may be completed by an integrated logic circuit of hardware in a processor and/or instructions in the form of software, and the steps of the method disclosed in the embodiments of the first aspect in the present application may be directly implemented as being completed by a hardware decoding processor, or implemented by a combination of hardware and a software module in the decoding processor. Optionally, the software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the method embodiment in the first aspect in the present application in combination with the hardware.

Figure 15:
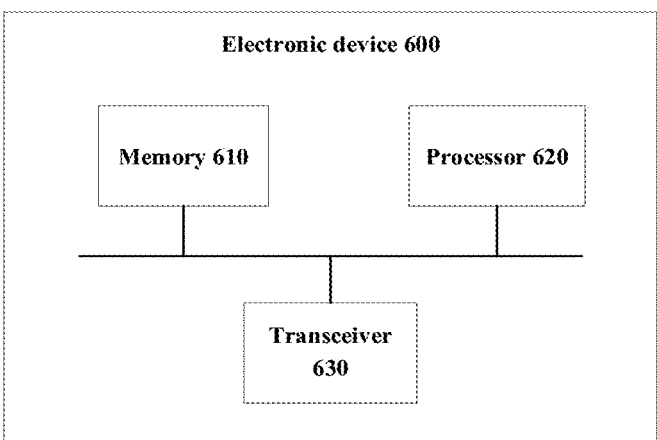
FIG. 15 is a schematic block diagram of an electronic device according to an embodiment of the present application.

FIG. 15 is a schematic block diagram of an electronic device according to an embodiment of the present application. As shown in FIG. 15, the electronic device 600 may include:

a memory 610 and a processor 620, where the memory 610 is configured to store a computer program, and transmit the program code to the processor 620. In other words, the processor 620 may call and execute the computer program from the memory 610, to implement the display control method in the embodiments of the present application.

For example, the processor 620 may be configured to perform the foregoing display control method embodiment according to instructions in the computer program.

In some embodiments of the present application, the processor 620 may include but is not limited to:

a general-purpose processor, a digital signal processor (Digital Signal Processor, DSP), an application specific integrated circuit (Application Specific Integrated Circuit, ASIC), a field programmable gate array (Field Programmable Gate Array, FPGA), or another programmable logic device, a discrete gate or transistor logic device, or a discrete hardware component.

In some embodiments of the present application, the memory 610 includes but is not limited to:

a volatile memory and/or a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), which is used as an external cache. By way of example but not limitation, many forms of RAM are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (synchlink DRAM, SLDRAM), and a direct rambus random access memory (Direct Rambus RAM, DR RAM).

In some embodiments of the present application, the computer program may be divided into one or more modules, and the one or more modules are stored in the memory 610 and executed by the processor 620 to complete the display control method provided in the present application. The one or more modules may be a series of computer program instruction segments that can complete specific functions, and the instruction segments are used to describe an execution process of the computer program in the electronic device.

As shown in FIG. 15, the electronic device 600 may further include:

a transceiver 630 that may be connected to the processor 620 or the memory 610.

The processor 620 may control the transceiver 630 to communicate with another device. Specifically, the processor 620 may send information or data to the another device, or receive information or data sent by the another device. The transceiver 630 may include a transmitter and a receiver. The transceiver 630 may further include an antenna, and a quantity of antennas may be one or more.

It should be understood that the components in the electronic device are connected to each other through a bus system, where the bus system includes, in addition to a data bus, a power bus, a control bus, and a status signal bus.

The present application further provides a computer storage medium having stored thereon a computer program that, when executed by a computer, causes the computer to be able to perform the display control method in the foregoing method embodiment.

An embodiment of the present application further provides a computer program product including program instructions that, when the program instructions is executed on an electronic device, cause the electronic device to perform the display control method in the foregoing method embodiment.

When implemented in software, all or some of the embodiments may be implemented in the form of a computer program product. The computer program product includes one or more computer instructions. When the computer program instructions are loaded and executed on a computer, all or some of the processes or functions according to the embodiments of the present application are generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by the computer or a data storage device, such as a server or a data center, integrating one or more usable media. The usable medium may be a magnetic medium (for example, a floppy disk, a hard disk, or a magnetic tape), an optical medium (for example, a digital versatile disc (Digital Versatile Disc, DVD)), a semiconductor medium (for example, a solid-state drive (Solid State Disk, SSD)), or the like.

A person of ordinary skill in the art may be aware that the modules and algorithm steps of the examples described in combination with the embodiments disclosed herein may be implemented by electronic hardware, or a combination of computer software and electronic hardware. Whether these functions are performed in hardware or software depends on the specific application and design constraints of the technical solutions. A person skilled in the art may implement the described functions using different methods for each specific application, but it should not be considered that the implementation goes beyond the scope of the present application.

In the several embodiments provided in the present application, it should be understood that the disclosed system, apparatus, and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings, direct couplings, or communication connections may be implemented through some interfaces. The indirect couplings or communication connections between the apparatuses or modules may be implemented in electrical, mechanical, or other forms.

The modules described as separate parts may or may not be physically separate, and parts displayed as modules may or may not be physical modules, and may be located at one position, or may be distributed on a plurality of network units. Some or all of the modules may be selected based on actual needs to achieve the objectives of the solutions of the embodiments. For example, the functional modules in each embodiment of the present application may be integrated into one processing module, each of the modules may exist alone physically, or two or more modules may be integrated into one module.

In the embodiments of the present application, the term "module" or "unit" refers to a computer program or a part of the computer program with a predetermined function, and works with other related parts to achieve a predetermined goal, and may be implemented wholly or partially using software, hardware (such as a processing circuit or a memory), or a combination thereof. Similarly, one processor (or multiple processors or memories) may be used to implement one or more modules or units. Moreover, each module or unit may be a part of an overall module or unit that includes the function of the module or unit.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A display control method, comprising:
  obtaining real-time position information of a controller, wherein the controller is configured to emit a virtual ray pointing to any virtual object in a virtual space;
  determining a target display form of the virtual ray according to the real-time position information of the controller; and
  adjusting a display form of the virtual ray according to the target display form of the virtual ray,
  wherein the virtual object comprises a near field region and a far field region, and the determining a target display form of the virtual ray according to the real-time position information of the controller comprises:
    in response to determining that the real-time position information of the controller is located in the near field region of the virtual object, determining a display form of the virtual ray in the near field region as the target display form of the virtual ray; and
    in response to determining that the real-time position information of the controller is located in the far field region of the virtual object, determining a display form of the virtual ray in the far field region as the target display form of the virtual ray, and wherein the display form of the virtual ray in the near field region is different from the display form of the virtual ray in the far field region.

2. The method according to claim 1, wherein the determining a display form of the virtual ray in the near field region comprises:
  in response to the controller being a first type of controller, determining the display form of the virtual ray in the near field region as a virtual pointer form; and
  in response to the controller being a second type of controller, determining the display form of the virtual ray in the near field region as a form with a preset transparency.

3. The method according to claim 1, wherein the determining a display form of the virtual ray in the far field region comprises:
  in response to the controller being a first type of controller, determining the display form of the virtual ray in the far field region as a linear form; and
  in response to the controller being a second type of controller, determining the display form of the virtual ray in the far field region as a preset form, wherein the preset form comprises a virtual pointer and a straight line.

4. The method according to claim 1, wherein the near field region comprises a first form transformation sub-region, and the method further comprises:
  in response to determining, based on the real-time position information of the controller, at least one of: the controller enters the first form transformation sub-region from the far field region, or, a moving direction of the controller is from the far field region to the near field region and a moving speed of the controller is greater than a preset speed, controlling the virtual ray to perform dynamic transformation from a first display form to a second display form,
  wherein the first display form is the display form of the virtual ray in the far field region, and the second display form is the display form of the virtual ray in the near field region.

5. The method according to claim 1, wherein the far field region comprises a second form transformation sub-region, and the method further comprises:
  in response to determining, based on the real-time position information of the controller, at least one of: the controller exits from the near field region to the second form transformation sub-region, or, a moving direction of the controller is from the near field region to the far field region and a moving speed of the controller is greater than the preset speed, controlling the virtual ray to perform dynamic transformation from the second display form to the first display form.

6. The method according to claim 1, further comprising:
  in response to determining that the real-time position information of the controller is located in the far field region of the virtual object, performing fade-in display on the virtual ray.

7. The method according to claim 1, further comprising:
  determining a target display form of visual indication information according to the real-time position information of the controller, wherein the visual indication information corresponds to the virtual ray; and
  adjusting a display form of the visual indication information according to the target display form of the visual indication information.

8. The method according to claim 7, wherein the determining a target display form of visual indication information according to the real-time position information of the controller comprises:

in response to determining that the real-time position information of the controller is located in the near field region of the virtual object, determining a third display form of the visual indication information on the virtual object, and using the third display form as the target display form of the visual indication information; and in response to determining that the real-time position information of the controller is located in the far field region of the virtual object, determining a fourth display form of the visual indication information on the virtual object, and using the fourth display form as the target display form of the visual indication information.

9. The method according to claim 8, wherein the near field region comprises a first form transformation sub-region, and the method further comprises:

in response to determining, based on the real-time position information of the controller, at least one of: the controller enters the first form transformation sub-region from the far field region, or, a moving direction of the controller is from the far field region to the near field region and a moving speed of the controller is greater than a preset speed, controlling the visual indication information to perform dynamic transformation from the fourth display form to the third display form.

10. The method according to claim 8, wherein the far field region comprises a second form transformation sub-region, and the method further comprises:

in response to determining, based on the real-time position information of the controller, at least one of: the controller exits from the near field region to the second form transformation sub-region, or, a moving direction of the controller is from the near field region to the far field region and a moving speed of the controller is greater than the preset speed, controlling the visual indication information to perform dynamic transformation from the third display form to the fourth display form.

11. The method according to claim 1, further comprising:

detecting, by the controller, interaction information entered by a user, and adjusting display forms of the virtual ray and visual indication information corresponding to the virtual ray.

12. An electronic device, comprising:

a processor and a memory, wherein the memory is configured to store a computer program, and the processor is configured to invoke and execute the computer program stored in the memory, to perform a display control method, the method comprises:

obtaining real-time position information of a controller, wherein the controller is configured to emit a virtual ray pointing to any virtual object in a virtual space;

determining a target display form of the virtual ray according to the real-time position information of the controller; and adjusting a display form of the virtual ray according to the target display form of the virtual ray, wherein the virtual object comprises a near field region and a far field region, and the determining a target display form of the virtual ray according to the real-time position information of the controller comprises:

in response to determining that the real-time position information of the controller is located in the near field region of the virtual object, determining a display form of the virtual ray in the near field region as the target display form of the virtual ray; and in response to determining that the real-time position information of the controller is located in the far field region of the virtual object, determining a display form of the virtual ray in the far field region as the target display form of the virtual ray, and wherein the display form of the virtual ray in the near field region is different from the display form of the virtual ray in the far field region.

13. The electronic device according to claim 12, wherein the determining a display form of the virtual ray in the near field region comprises:

in response to the controller being a first type of controller, determining the display form of the virtual ray in the near field region as a virtual pointer form; and in response to the controller being a second type of controller, determining the display form of the virtual ray in the near field region as a form with a preset transparency.

14. The electronic device according to claim 12, wherein the determining a display form of the virtual ray in the far field region comprises:

in response to the controller being a first type of controller, determining the display form of the virtual ray in the far field region as a linear form; and in response to the controller being a second type of controller, determining the display form of the virtual ray in the far field region as a preset form, wherein the preset form comprises a virtual pointer and a straight line.

15. The electronic device according to claim 12, wherein the near field region comprises a first form transformation sub-region, and the method further comprises:

in response to determining, based on the real-time position information of the controller, at least one of: the controller enters the first form transformation sub-region from the far field region, or, a moving direction of the controller is from the far field region to the near field region and a moving speed of the controller is greater than a preset speed, controlling the virtual ray to perform dynamic transformation from a first display form to a second display form, wherein the first display form is the display form of the virtual ray in the far field region, and the second display form is the display form of the virtual ray in the near field region.

16. The electronic device according to claim 15, wherein the far field region comprises a second form transformation sub-region, and the method further comprises:

in response to determining, based on the real-time position information of the controller, at least one of: the controller exits from the near field region to the second form transformation sub-region, or, a moving direction of the controller is from the near field region to the far field region and a moving speed of the controller is greater than the preset speed, controlling the virtual ray to perform dynamic transformation from the second display form to the first display form.

17. The electronic device according to claim 12, further comprising:

in response to determining that the real-time position information of the controller is located in the far field region of the virtual object, performing fade-in display on the virtual ray.

18. A non-transitory computer-readable storage medium, configured to store a computer program, where the computer program enables a computer to perform a display control method, the method comprises:

obtaining real-time position information of a controller, wherein the controller is configured to emit a virtual ray pointing to any virtual object in a virtual space;

determining a target display form of the virtual ray according to the real-time position information of the controller; and adjusting a display form of the virtual ray according to the target display form of the virtual ray, wherein the virtual object comprises a near field region and a far field region, and the determining a target display form of the virtual ray according to the real-time position information of the controller comprises:

in response to determining that the real-time position information of the controller is located in the near field region of the virtual object, determining a display form of the virtual ray in the near field region as the target display form of the virtual ray; and in response to determining that the real-time position information of the controller is located in the far field region of the virtual object, determining a display form of the virtual ray in the far field region as the target display form of the virtual ray, and wherein the display form of the virtual ray in the near field region is different from the display form of the virtual ray in the far field region.

* * * * *